Patented May 7, 1929.

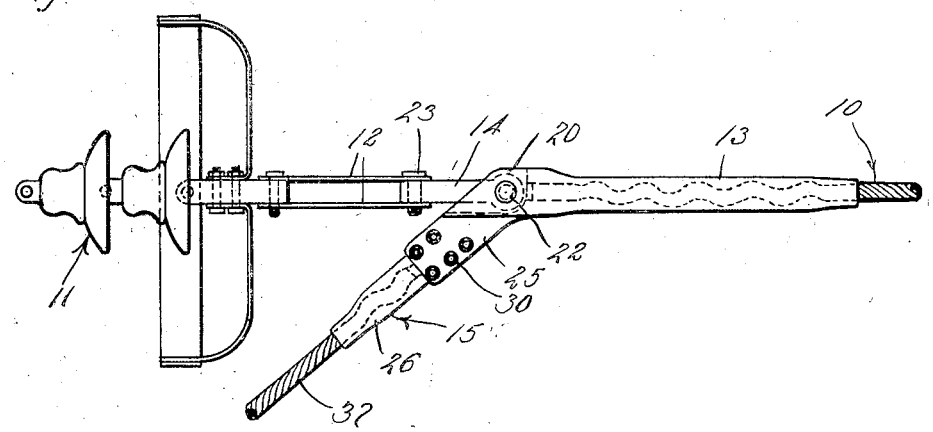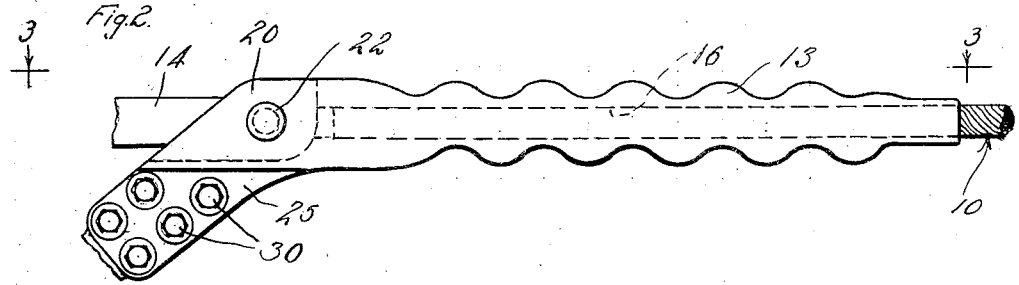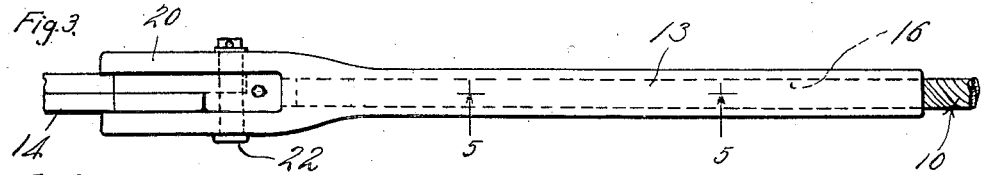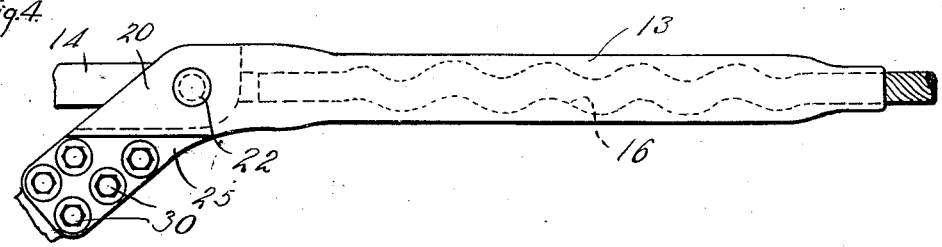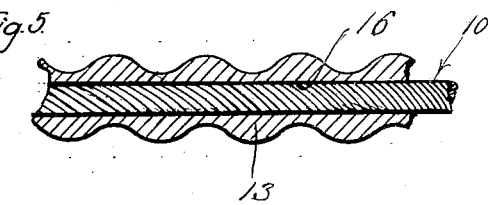

1,711,832

UNITED STATES PATENT OFFICE.

ELLIS W. COOPER, OF LOS ANGELES, CALIFORNIA.

METHOD OF MAKING CONNECTIONS.

Application filed December 6, 1927. Serial No. 238,018.

This invention has to do with a method of making a cable connection, and it is an object of the invention to provide a simple effective and improved method of making connection with the end of a cable, or the like.

Wires, cables and like members are frequently held by connectors which, in turn, are connected to poles or other suitable supports. Most connectors involve wedge devices or clamps and, in addition to being more or less complicated in construction and manipulation, are not altogether reliable or effective. Particular difficulty is experienced in holding the ends of heavy flexible cables, such, for instance, as are used in the transmission of electrical energy. These cables are commonly formed with a steel core surrounded by strands of aluminum or copper.

It is an object of this invention to provide a holding device that will effectively and securely hold a cable, or the like, and which is extremely simple in construction and application.

A further object of the invention is to provide a method of making a connection that will hold a cable of the character mentioned in a manner to develop the full strength of the core and also the core surrounding strands.

It is a particular object of this invention to provide a method of making a connection of the character mentioned whereby a cable can be quickly and securely gripped without the exercise of skill and without the use of special tools or equipment.

A further object of the invention is to provide a method of making a connection so that the connection when made readily reveals whether or not there is a full and secure grip on the cable.

The various objects and features of the invention will be best and more fully understood from the following detailed description of a typical manner of carrying out the invention, throughout which description reference is had to the accompanying drawings, in which:

Fig. 1 is a side elevation of a connector for carrying out my invention showing it in operating position connecting a cable and a string of insulators;

Fig. 2 is an enlarged side elevation of the connector before it has been set on the cable;

Fig. 3 is a top or plan elevation of the connector, being a view taken as indicated by line 3—3 on Fig. 2;

Fig. 4 is a view similar to Fig. 2 showing the connector set or applied to a cable; and Fig. 5 is a detailed sectional view, taken as indicated by line 5—5 on Fig. 3.

The connector provided for carrying out my invention may be used to advantage in various places and under various conditions where it is desired to connect the end of a wire, cable, or other like part, with another part or object. The invention is particularly useful in connection with mounting or stringing stranded cable such as is commonly used for the transmission of electrical energy and, therefore, I have chosen to set forth a form and application of the invention particularly suited for this use.

In the drawings, I have shown the connector provided by my invention serving to connect a stranded cable 10 with a string of insulators 11.

The cable 10, referred to for purpose of example, may be an ordinary stranded cable having a core of high tensile strength, carrying strands of copper, aluminum, or other conductive material. The string of insulators 11 is of typical construction and is shown provided with a pair of links 12 for connection with the inner end of the connector.

The form of connector illustrated in the drawings includes, generally, a body 13 which receives and holds the cable 10, a coupling 14 at the inner end of the body to connect the body with the links 12, and a jumper loop connection 15 in connection with the body.

The body 13 is an elongate member formed of malleable material. The body 13, as initially-formed, that is, in its form ready for use, is laterally curved, it being preferred to corrugate it throughout a substantial portion of its length in a manner such as is clearly illustrated in Figs. 2 and 5 of the drawings. By corrugating the body, it has opposite sides provided with folds or alternating ridges and grooves. In the preferred construction, the body is made substantially rectangular in cross sectional configuration, and it is made of uniform cross section throughout the corrugated portion, in the form of the invention illustrated in the drawings, the body is corrugated from one end to the other and is corrugated in one direction only, as will be seen from inspection of the drawings. It is to be understood, however, that the corrugated portion of the body may vary in extent and proportioning and that the body may be corrugated in two directions as well as in one direction, if so desired.

The body 13, as initially formed, has a cable opening 16 extending into it from its outer end to receive the cable 10. The cable opening 16 extends straight into the body from its outer end and through the corrugated portion of the body. In the form of the invention illustrated in the drawings, the cable opening 16 is in the form of a straight central longitudinal bore extending throughout the length of the body 13. It will be obvious that the opening does not have to extend the entire length of the body. The cable opening is preferably made just sufficiently large to receive the cable 10 to be handled by the connector.

In putting the connector into use, that is, in applying it to a cable 10, as provided by my invention the end of the cable 10 is slid or passed into the cable opening to extend through the corrugated portion of the body. The body is then worked to distort or crimp the cable within it. This is done by acting on the corrugated portion of the body, for instance, by pressing or hammering it, until it is substantially straight, as shown in Fig. 4. By thus hammering or straightening out the corrugation of the body, the cable within this portion of the body is crimped or bent to about the shape of the original corrugation of the body. It will be apparent that this working of the body brings the body in pressure engagement with the cable and so crimps or distorts the cable that it cannot be withdrawn from the body. Both the core and exterior of the cable are crimped in the body so that the cable is held in a manner to develop its full strength. Further, the pressure engagement developed between the body and cable by the hammering or distortion assure an efficient electrical connection between the parts. In practice, I prefer to form the body 13 of a material just sufficiently malleable to allow it to be hammered from the corrugated form shown in Fig. 2 to the straight cable gripping form shown in Figs. 1 and 4. Castings of malleable alloys have been found practical and economical.

In the construction illustrated in the drawings, the inner end of the body 13 is yoked to have spaced side parts 20 that receive the coupling 14. The coupling extends between the spaced parts 20 of the body and is attached to the body by a pin 22 that extends between the side parts 20 and through a suitable opening in the coupling. The projecting end portion of the coupling 14 is provided with an opening that receives a link carrying pin 23. This provides a simple, practical and effective construction whereby the body 13 may be connected with a string of insulators, or any other suitable object.

The jumper loop connection 15 is shown secured to a flange 25 projecting from the inner end portion of the body 13. The connections 15, shown in the drawings, embodies the present invention. The connection comprises a body 26 of malleable material having an opening receiving the end of the jumper loop cable 37 and worked to crimp and grip the cable 37, the same as the body 13 crimps and grips the cable 10. The body 26 of the connection 15 is connected to the flange 25 by bolts 30.

From the foregoing description, it will be apparent that my invention provides a method of making a connection which is not only extremely simple and inexpensive of execution, but also result in a reliable and secure connection. The device described can be properly and safely applied without the exercise of great care or skill as a secure and effective grip is bound to result when the corrugated body with the cable in it is hammered or worked into the straight form. The exterior of the body reveals whether or not the cable is fully gripped and, therefore, the device can be quickly and accurately inspected by merely glancing at it.

Having described only a typical preferred manner of carrying out my invention, I do not wish to limit myself to the specific details set forth, but wish to reserve to myself any changes or variations that may appear to those skilled in the art or fall within the scope of the following claims.

Having described my invention, I claim:

1. The method of connecting a cable and a corrugated body having a straight opening extending into it from one end and through the corrugated portion including placing the end portion of the cable in the opening and then applying force to the corrugated portion of the body.

2. The method of connecting a cable and a corrugated body having a straight opening extending into it from one end and through the corrugated portion including placing the end portion of the cable in the opening and then bending the cable-carrying portion of the body so that the cable is bent.

3. The method of connecting a cable and a corrugated body having a straight opening extending into it from one end and through the corrugated portion including placing the end portion of the cable in the opening and then acting on the corrugations to straighten the body.

In witness that I claim the foregoing I have hereunto subscribed my name this ninth day of November, 1927.

ELLIS W. COOPER.